United States Patent
Bauer

(10) Patent No.: US 9,160,256 B1
(45) Date of Patent: Oct. 13, 2015

(54) SOFT-START CONTROL FOR ELECTROMECHANICAL DEVICES USING A RESISTOR-CAPACITOR CIRCUIT

(71) Applicant: Hamilton Sundstrand Corporation, Windsor Locks, CT (US)

(72) Inventor: Ronald P. Bauer, Windsor Locks, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 70 days.

(21) Appl. No.: 14/220,246

(22) Filed: Mar. 20, 2014

(51) Int. Cl.
*H02P 1/04* (2006.01)
*H02P 1/16* (2006.01)

(52) U.S. Cl.
CPC ........................................ *H02P 1/16* (2013.01)

(58) Field of Classification Search
CPC ....... H02P 7/0066; H02P 27/047; H02P 3/08; F04B 43/06; H02M 3/156; H02M 3/07
USPC ......... 318/430, 432, 434, 445, 472, 479, 504; 417/44.11, 44.1, 45, 423.5
See application file for complete search history.

(56) References Cited

U.S. PATENT DOCUMENTS

| | | | | |
|---|---|---|---|---|
| 4,412,158 A * | 10/1983 | Jefferson et al. | ............... | 318/257 |
| 4,801,247 A * | 1/1989 | Hashimoto et al. | ........... | 417/213 |
| 5,545,012 A * | 8/1996 | Anastos et al. | ............ | 417/44.11 |
| 6,031,352 A * | 2/2000 | Carlson | ......... | 318/811 |
| 8,564,233 B2 * | 10/2013 | Kidd et al. | ..................... | 318/432 |

* cited by examiner

*Primary Examiner* — Bentsu Ro
*Assistant Examiner* — Thai Dinh
(74) *Attorney, Agent, or Firm* — Kinney & Lange, P.A.

(57) ABSTRACT

A system for controlling an electromechanical device includes a motor drive, a main controller, a voltage regulator and a resistor-capacitor circuit. The motor drive controls an electric motor of the electromechanical device. The main controller provides motor commands to control the motor drive that are provided by providing command voltage on at least one command line. The voltage regulator circuit receives the command voltage and provides a motor voltage to power the motor drive. A capacitor of the resistor-capacitor circuit is charged by the command voltage, and the motor voltage is controlled based upon charge of the capacitor.

14 Claims, 3 Drawing Sheets

SOFT-START CONTROL FOR ELECTROMECHANICAL DEVICES USING A RESISTOR-CAPACITOR CIRCUIT

BACKGROUND

The present invention relates generally to electromechanical device control, and in particular to a system and method for providing soft-start control for electromechanical devices using a resistor-capacitor circuit.

Electromechanical devices, such as valves, pumps, relays, and solenoids, may include electric motor based actuators to drive the device. These devices may be self-contained components that are utilized, for example, in aircraft systems. Commands are provided to the motor indicative of a desired action and are often also utilized to provide power to drive the motor. Because of the instantaneous application of voltage to the motor from the commands, a large stator inrush current creates a large torque spike in the gear train of the actuator. These torque spikes occur each time a new command is issued to the valve which creates excess stress and wear and tear in the mechanical gear train. This reduces the life and reliability of the actuator and requires the use of more durable materials. It is desirable to limit these torque spikes in order to increase reliability of the gear train and facilitate the use of lighter, more cost-efficient materials for the manufacture of electromechanical valve actuators.

SUMMARY

A system for controlling an electromechanical device includes a motor drive, a main controller, a voltage regulator and a resistor-capacitor circuit. The motor drive controls an electric motor of the electromechanical device. The main controller provides motor commands to control the motor drive that are provided by providing command voltage on at least one command line. The voltage regulator circuit receives the command voltage and provides a motor voltage to power the motor drive. A capacitor of the resistor-capacitor circuit is charged by the command voltage, and the motor voltage is controlled based upon charge of the capacitor.

DETAILED DESCRIPTION

A hardware based soft-start system and method for electromechanical devices is disclosed herein that removes large torque spikes created during initial application of power to an electric motor of the device. In past systems, upon receiving motor commands, a large torque spike from the command voltage would initially be created in the gear train of the actuator, requiring the gear train to be heavier and more durable. By utilizing a resistor-capacitor circuit in conjunction with a motor voltage regulator circuit, a soft-start may be provided to the motor upon receipt of a new command. This reduces the torque spikes, which allows for the manufacture of gear trains that utilize less durable or lighter weight materials.

Figure 1:
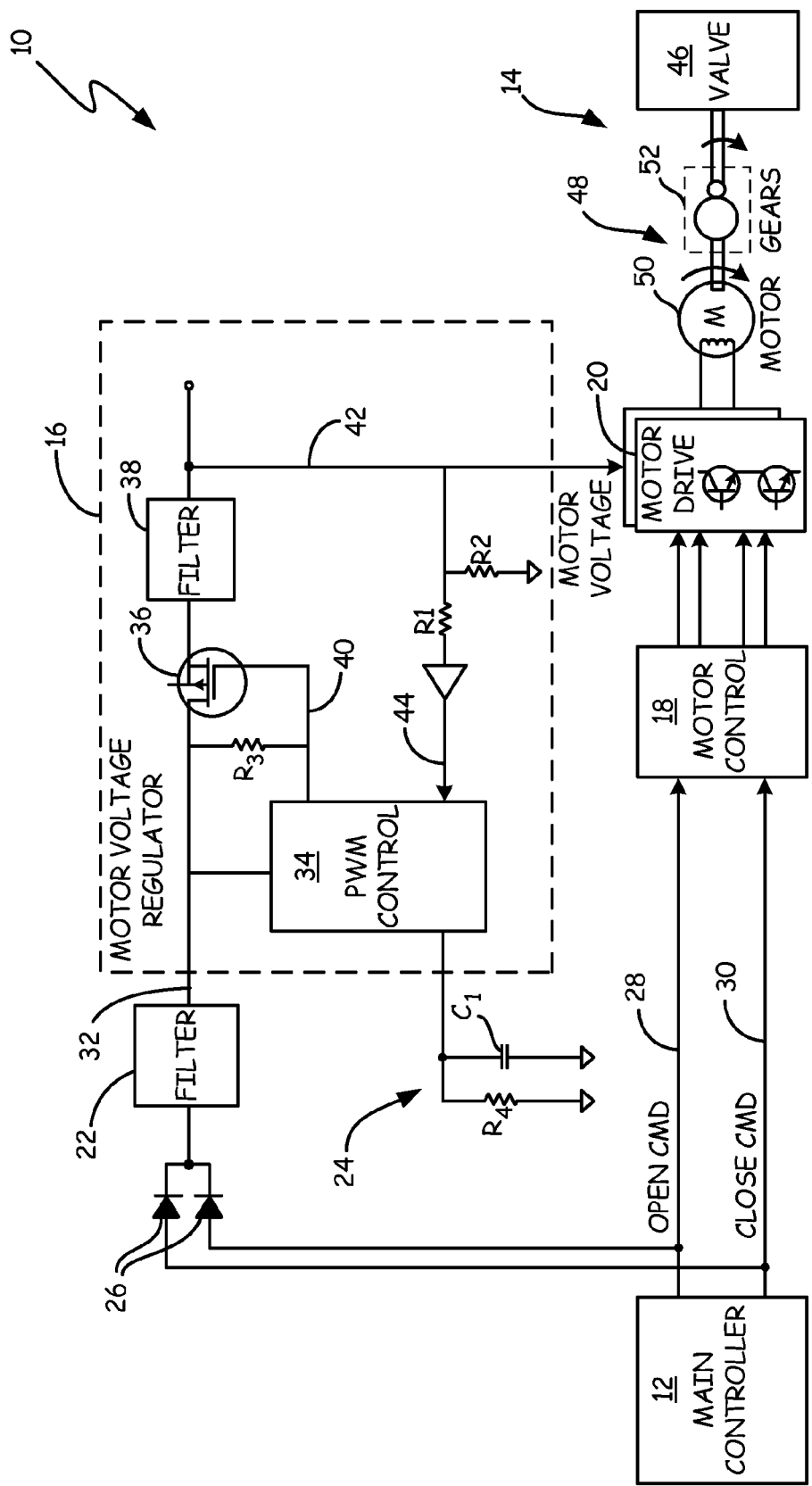
FIG. 1 is a circuit diagram illustrating a control system that includes soft-start hardware.

FIG. 1 is a circuit diagram illustrating electromechanical device control system 10 that includes soft-start hardware. System 10 includes main controller 12, electromechanical valve assembly 14, motor voltage regulator 16, motor control 18, motor drive 20, filter 22, resistor-capacitor (RC) circuit 24, diodes 26, open command line 28, close command line 30, and input line 32. Motor voltage regulator 16 includes pulse-width modulation (PWM) control 34, switch 36, filter 38, switch control line 40, direct current (DC) output 42, feedback line 44, and resistors $R_1$, $R_2$ and $R_3$. Electromechanical valve assembly 14 includes valve 46 and actuator 48, which includes motor 50, and gear train 52. Valve 46 may be any valve that is adjustable to control a fluid flow such as, for example, a butterfly valve. Although illustrated in FIG. 1 as a control system for a valve assembly, control system 10 may be utilized to provide soft-start for any electromechanical device such as, for example, a pump, fan, relay, solenoid, or any other electromechanical device.

Main controller 12 provides commands to control the position of valve 46. Commands are issued on open command line 28 and close command line 30. For example, to move valve 46 into a more 'open' state to allow greater fluid flow through valve 46, a voltage may be provided on open command line 28. To move valve 46 into a more 'closed' state, a voltage may be provided on close command line 30. These command voltages may be, for example, a standard aircraft DC bus voltage such as twenty-eight volts. These voltages are received and interpreted by motor control 18, however, the voltages on command lines 28 and 30 are not utilized to power motor control 18 and motor drive 20. Motor control 18 interprets the command voltages on lines 28 and 30 to provide control commands to motor drive 20. Although illustrated in FIG. 1 as two command lines 28 and 30, any number of desired command lines may be utilized to provide command voltages to motor control 18. For example, a single command line may be utilized to indicate an on/off command for electromechanical devices such as, for example, pumps, fans, solenoids or any other electromechanical device.

Power provided to motor drive 20 to drive electromechanical valve assembly 14 may be derived from the command voltages provided on command lines 28 and 30 through voltage regulator 16. The command voltages are received by motor voltage regulator 16 through diodes 26 and filter 22. Filter 22 may be, for example, a DC ripple filter utilized to filter any unwanted ripple currents on input line 32, or any other type of EMI filter utilized to filter a condition on input line 32. Voltage regulator 16 provides a soft-start for motor drive 20 upon receiving a new command, and provides a constant voltage to motor drive 20 following the soft-start. Motor drive 20 may provide, for example, a direct current to motor 50, or may be implemented as an inverter and provide alternating current to motor 50.

In the exemplary embodiment shown in FIG. 1, the output of voltage regulator 16 is provided from switch 36 through filter 38. PWM controller 34 controls switch 36 using pulse-width modulation to control the output voltage on output line 42. PWM controller 34 is any controller capable of providing pulse-width modulation control of switch 36 such as, for example, a Texas Instruments® TL5001. Filter 38 is, for example, a smoothing filter to convert the pulse-width modulated output from switch 36 into a constant DC voltage. The level of DC voltage is directly proportional to the duty-cycle of the pulse-width modulation. In other embodiments, it may be desirable to provide motor drive 20 with power from a primary power bus, such as, for example, a two hundred seventy volt bus onboard an aircraft. In this case, another switch may be implemented between filter 38 and the primary power bus that is controlled by the output of switch 36. In this way, motor drive 20 may receive power from a primary power bus while still receiving soft-start control by motor voltage regulator 16 for each command.

During soft-start, PWM controller 34 controls switch 36 to adjust the output voltage on output line 42 based upon the charge of capacitor $C_1$. When a command has not recently been issued on either command line 28 or 30, capacitor $C_1$ has little to no charge. As voltage is received on inlet 32, it is passed through PWM controller to charge capacitor $C_1$. The voltage across capacitor $C_1$ is monitored by PWM controller 34 and the duty cycle produced by PWM controller 34 is increased as the charge of capacitor $C_1$ is increased. The rate at which capacitor $C_1$ charges is equal to $1-e^{-(t/\tau)}$ where $\tau$ is equal to the resistance of $R_4$ multiplied by the capacitance of $C_1$. Therefore, the values of $R_1$ and $C_1$ may be selected to achieve any desired soft-start rate or tune the soft-start for any motor 50. By providing a soft-start voltage to motor drive 20 based upon the charge of capacitor $C_1$, large torque spikes to motor 50 and gear train 52 are avoided. By avoiding these large torque spikes, lighter and more cost-effective materials may be used to construct motor 50 and gear train 52, reducing the overall cost and weight of system 10.

Once capacitor $C_1$ is fully charged, PWM controller 34 monitors feedback line 44 in order to provide a substantially constant voltage to motor drive 20 on output line 42 for the duration of the command from main controller 12. The voltage on output line 42 may fluctuate, for example, based upon the draw from motor drive 20 or inconsistencies in the voltage on line 32. Because of this, PWM controller 34 controls the duty cycle on control line 40 to ensure a constant voltage on output line 42. This constant voltage is any desired motor drive voltage such as, for example, twelve volts. Upon termination of the command from main controller 12, voltage regulator 16 stops providing voltage on output 42 and capacitor $C_1$ discharges through resistor $R_4$.

Figure 2:
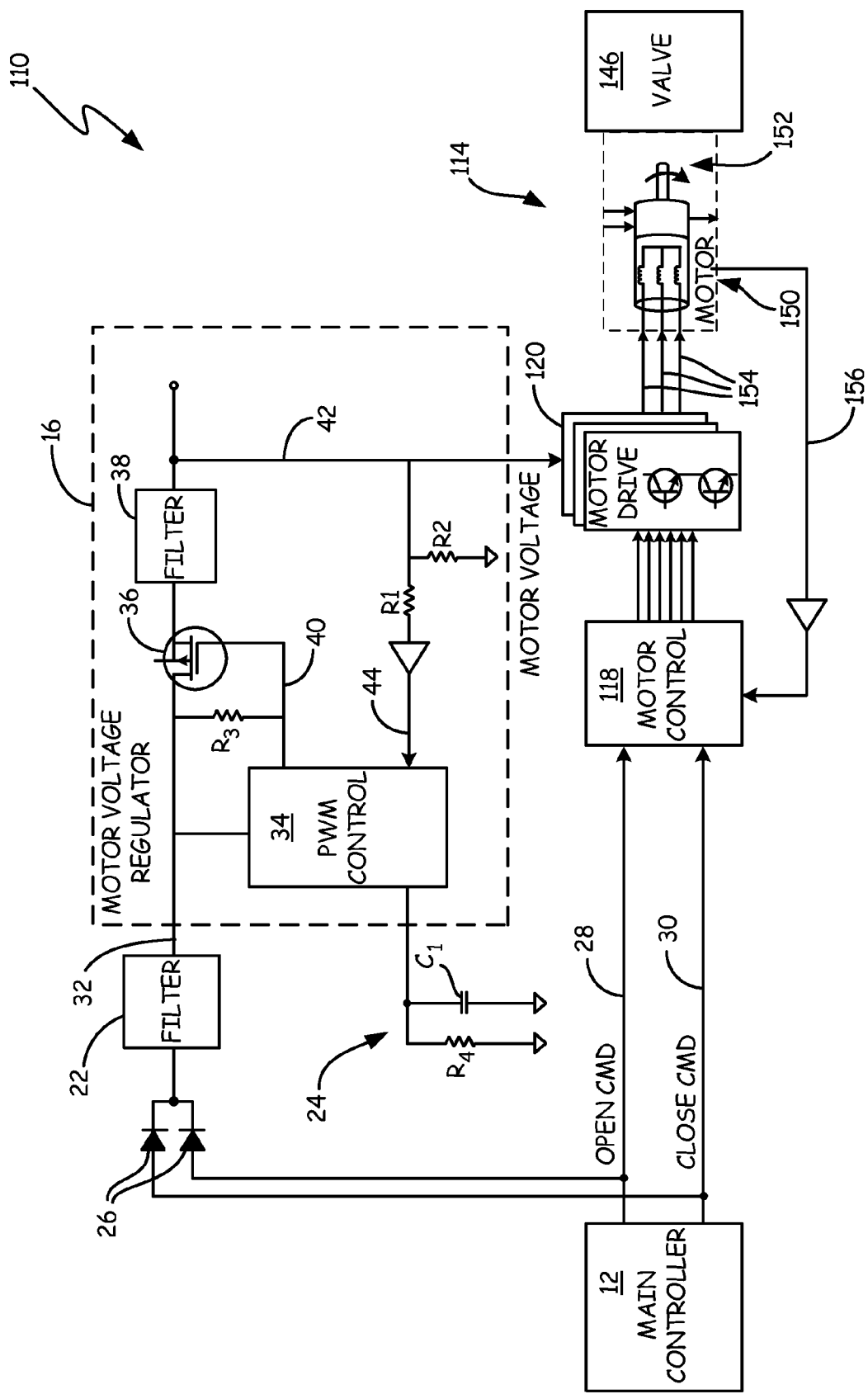
FIG. 2 is a circuit diagram illustrating an electromechanical valve control system that includes soft-start hardware for a three-phase motor driven electromechanical valve.

FIG. 2 is a circuit diagram illustrating an electromechanical valve control system 110 that includes soft-start hardware for three-phase motor driven electromechanical valve assembly 114. Items numbered with the same numeral as FIG. 1 operate in a substantially similar manner to those of system 10. Three-phase electromechanical valve assembly 114 includes three-phase motor 150 and rotor 152 utilized to control the position of valve 146. Valve 146 may be, for example, a butterfly valve or any other valve controlled by a three-phase motor-driven actuator. Although illustrated in FIG. 2 as providing soft-start for valve assembly 114, system 110 may be utilized to provide soft-start for any electromechanical device such as, for example, a pump, fan, relay, solenoid, or any other electromechanical device. Motor control 118 receives the commands from main controller 12 and provides control signals to motor drive 120 based upon the received commands. Motor drive 120 may be, for example, a three-phase inverter that provides a three-phase AC output. Motor control 118 may also receive feedback 156 from motor 150 to further facilitate control of electromechanical valve assembly 114. By providing a soft-start voltage to motor drive 120 based upon the charge of capacitor $C_1$, large torque spikes to motor 150 and gear train 152 are avoided. By avoiding these large torque spikes, lighter and more cost-effective materials may be used to construct motor 150 and gear train 152, reducing the overall cost and weight of system 110.

Figure 3:
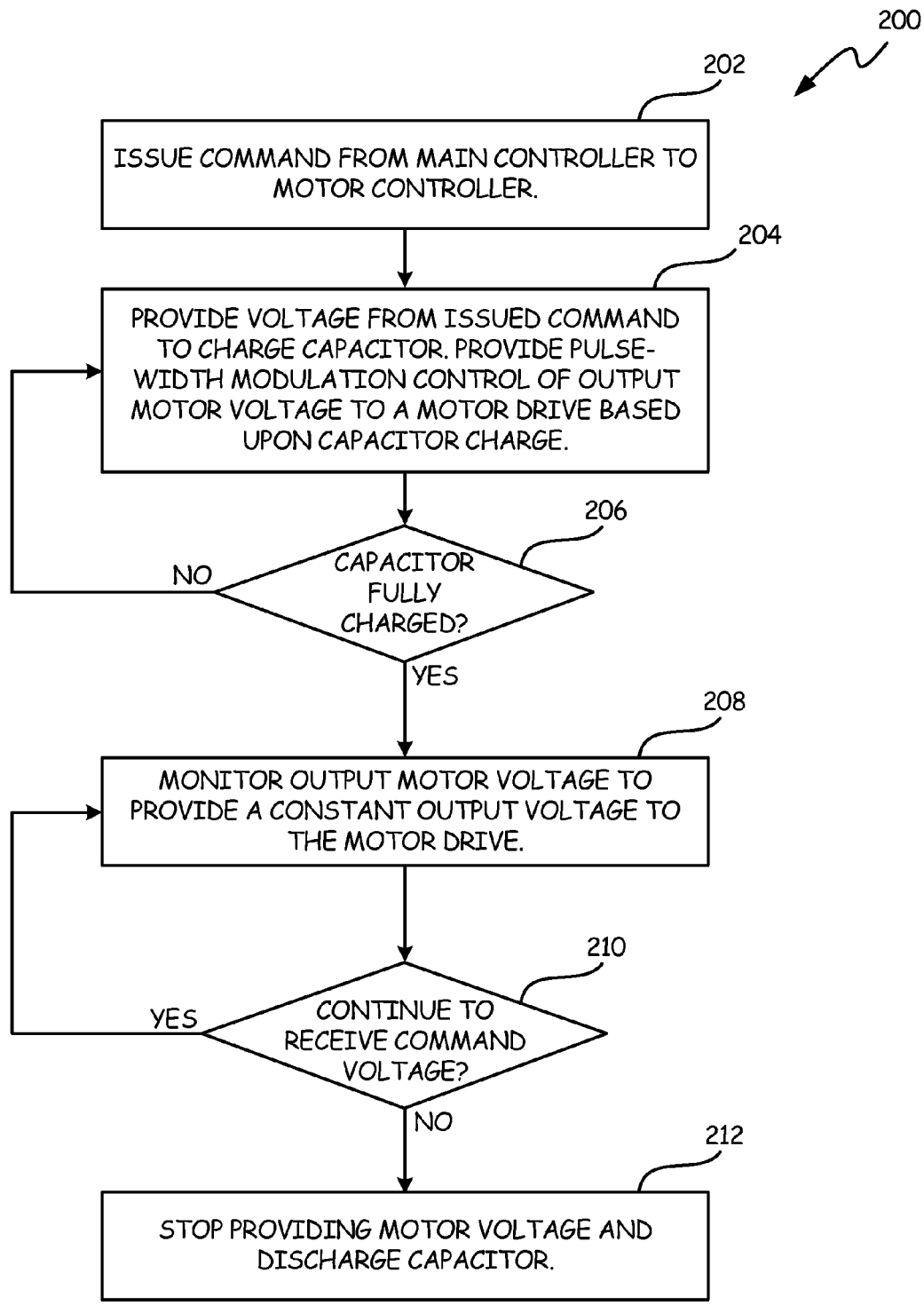
FIG. 3 is a flowchart illustrating a method for controlling an electromechanical valve using soft-start hardware.

With continuing reference to FIG. 1, FIG. 3 is a flowchart illustrating method 200 for controlling electromechanical devices using soft-start hardware. At step 202, a command is issued by main controller 12. Main controller 12 issues the command by providing a voltage, such as twenty-eight volts, on one of command line 28 or command line 30. At step 204, the voltage is received by motor voltage regulator 16, and is provided to RC circuit 24 to charge capacitor $C_1$. PWM controller 34 provides pulse-width modulation control of switch 36 to control the motor voltage provided to motor drive 20 from voltage regulator 16 based upon the charge of capacitor $C_1$. At step 206, it is determined by PWM controller 34 if capacitor $C_1$ has reached full charge. If it has not, method 200 returns to step 204 and capacitor $C_1$ continues to charge. If it has, method 200 proceeds to step 208. At step 208, PWM controller 34 monitors the motor voltage in order to provide a constant voltage to motor drive 20. For example, PWM controller 34 may control switch 36 based upon feedback line 44 in order to ensure that the motor voltage remains, for example, twelve volts. At step 210, it is determined if motor voltage regulator 16 is continuing to receive voltage from main controller 12. If it is, method 200 returns to step 208. If it is not, then method 200 proceeds to step 212. At step 212, motor voltage regulator 16 stops providing a motor voltage to motor drive 16, and capacitor $C_1$ discharges through resistor $R_4$.

Discussion of Possible Embodiments

The following are non-exclusive descriptions of possible embodiments of the present invention.

A system for controlling an electromechanical device includes a motor drive, a main controller, a voltage regulator and a resistor-capacitor circuit. The motor drive controls an electric motor of the electromechanical device. The main controller provides motor commands to control the motor drive that are provided by providing command voltage on at least one command line. The voltage regulator circuit receives the command voltage and provides a motor voltage to power the motor drive. A capacitor of the resistor-capacitor circuit is charged by the command voltage, and the motor voltage is controlled based upon charge of the capacitor.

The system of the preceding paragraph can optionally include, additionally and/or alternatively, any one or more of the following features, configurations and/or additional components:

A further embodiment of the foregoing system, wherein the voltage regulator circuit includes a regulator controller, and a switch. The regulator controller controls the switch to provide the command voltage from a switch input to a switch output. The regulator controller controls the switch based upon the charge of the capacitor while the capacitor is charging.

A further embodiment of any of the foregoing systems, wherein the regulator controller controls the switch to keep the motor voltage at a substantially constant value when the capacitor is fully charged.

A further embodiment of any of the foregoing systems, wherein the regulator controller utilizes pulse-width modulation to control the switch.

A further embodiment of any of the foregoing systems, wherein the voltage regulator circuit terminates the motor voltage when the main controller terminates the command voltage, and wherein the capacitor discharges through a resistor of the resistor-capacitor circuit when the main controller terminates the command voltage.

A further embodiment of any of the foregoing systems, wherein the motor voltage regulator includes a filter to smooth the motor voltage provided from the switch output.

A further embodiment of any of the foregoing systems, wherein the electric motor is a three-phase motor.

A method for controlling an electromechanical device includes, among other things: providing, using a primary controller, command voltage indicative of motor drive commands for a motor controller; receiving, using a voltage regulator circuit, the command voltage; charging, using a resistor-capacitor circuit, a capacitor using the command voltage; providing motor voltage to a motor drive from the voltage regulator circuit, wherein the motor voltage is based upon the command voltage and charge of the capacitor; and controlling an electric motor of the electromechanical device using the actuator motor controller, the motor drive and the motor voltage.

The method of the preceding paragraph can optionally include, additionally and/or alternatively, any one or more of the following features, configurations and/or additional components:

A further embodiment of the foregoing method, wherein providing, using the primary controller, command voltage includes providing a voltage on at least one command line to control the electromechanical device.

A further embodiment of any of the foregoing methods, wherein providing motor voltage to the motor drive includes controlling, using a regulator controller, a switch to control the motor voltage based upon the charge of the capacitor.

A further embodiment of any of the foregoing methods, wherein providing motor voltage to the motor drive further includes controlling, using the regulator controller, the switch to provide the motor voltage at a substantially constant value when the capacitor is fully charged.

A further embodiment of any of the foregoing methods, wherein controlling, using the regulator controller, the switch comprises controlling the switch using pulse-width modulation.

A further embodiment of any of the foregoing methods, further comprising terminating, using the voltage regulator circuit, the motor voltage when the primary controller is no longer providing the command voltage, and discharging, using the resistor-capacitor circuit, the capacitor through a resistor when the primary controller is no longer providing the command voltage.

A further embodiment of any of the foregoing methods, wherein the electric motor is a three-phase motor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for controlling an electromechanical device, the system comprising:
   a motor drive that controls an electric motor of the electromechanical device;
   a main controller that provides motor commands to control the motor drive, wherein the motor commands are provided by providing command voltage on at least one command line;
   a voltage regulator circuit that receives the command voltage and provides a motor voltage to power the motor drive; and
   a resistor-capacitor circuit, wherein a capacitor of the resistor-capacitor circuit is charged by the command voltage, and wherein the motor voltage is controlled based upon charge of the capacitor.

2. The system of claim 1, wherein the voltage regulator circuit comprises:
   a regulator controller; and
   a switch, wherein the regulator controller controls the switch to provide the command voltage from a switch input to a switch output;
   wherein the regulator controller controls the switch based upon the charge of the capacitor while the capacitor is charging.

3. The system of claim 2, wherein the regulator controller controls the switch to keep the motor voltage at a substantially constant value when the capacitor is fully charged.

4. The system of claim 2, wherein the regulator controller utilizes pulse-width modulation to control the switch.

5. The system of claim 1, wherein the voltage regulator circuit terminates the motor voltage when the main controller terminates the command voltage, and wherein the capacitor discharges through a resistor of the resistor-capacitor circuit when the main controller terminates the command voltage.

6. The system of claim 2, wherein the motor voltage regulator includes a filter to smooth the motor voltage provided from the switch output.

7. The system of claim 1, wherein the electric motor is a three-phase motor.

8. A method for controlling an electromechanical device, the method comprising:
   providing, using a primary controller, command voltage indicative of motor drive commands for a motor controller;
   receiving, using a voltage regulator circuit, the command voltage;
   charging, using a resistor-capacitor circuit, a capacitor using the command voltage;
   providing motor voltage to a motor drive from the voltage regulator circuit, wherein the motor voltage is based upon the command voltage and charge of the capacitor; and
   controlling an electric motor of the electromechanical device using the motor controller, the motor drive and the motor voltage.

9. The method of claim 8, wherein providing, using the primary controller, command voltage comprises providing a voltage on at least one command line to control the electromechanical device.

10. The method of claim 8, wherein providing motor voltage to the motor drive comprises:
    controlling, using a regulator controller, a switch to control the motor voltage based upon the charge of the capacitor.

11. The method of claim 10, wherein providing motor voltage to the motor drive further comprises:
    controlling, using the regulator controller, the switch to provide the motor voltage at a substantially constant value when the capacitor is fully charged.

12. The method of claim 10, wherein controlling, using the regulator controller, the switch comprises controlling the switch using pulse-width modulation.

13. The method of claim 8, further comprising:
    terminating, using the voltage regulator circuit, the motor voltage when the primary controller is no longer providing the command voltage; and
    discharging, using the resistor-capacitor circuit, the capacitor through a resistor when the primary controller is no longer providing the command voltage.

14. The method of claim 8, wherein the electric motor is a three-phase motor.

* * * * *